Aug. 3, 1965  I. JEPSON ETAL  3,198,490
BEATER EJECTING MEANS FOR AN ELECTRIC FOOD MIXER
Original Filed Aug. 25, 1958  4 Sheets-Sheet 2
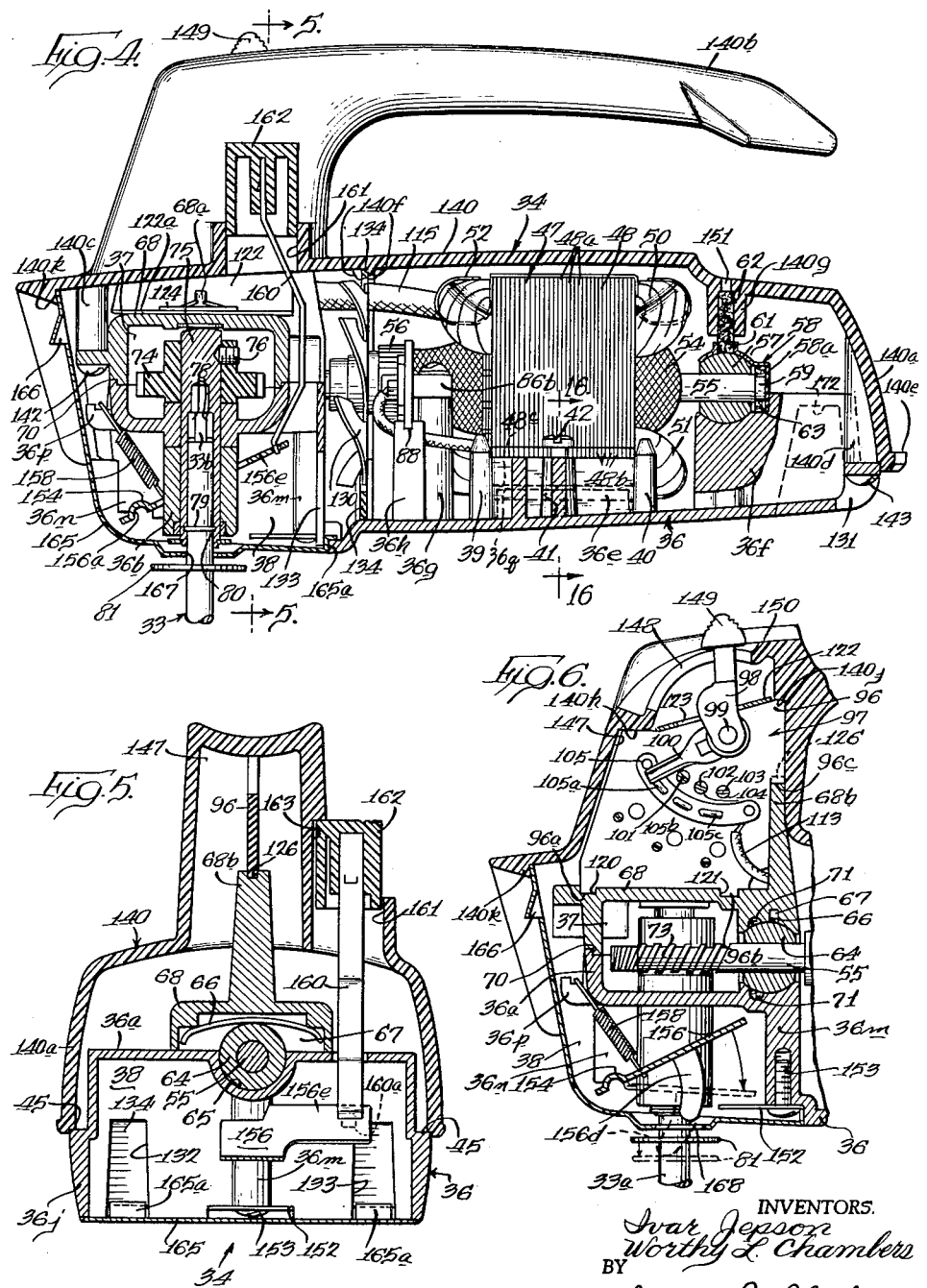
INVENTORS.
Ivar Jepson
Worthy L. Chambers
BY
George R. Clark
Atty.

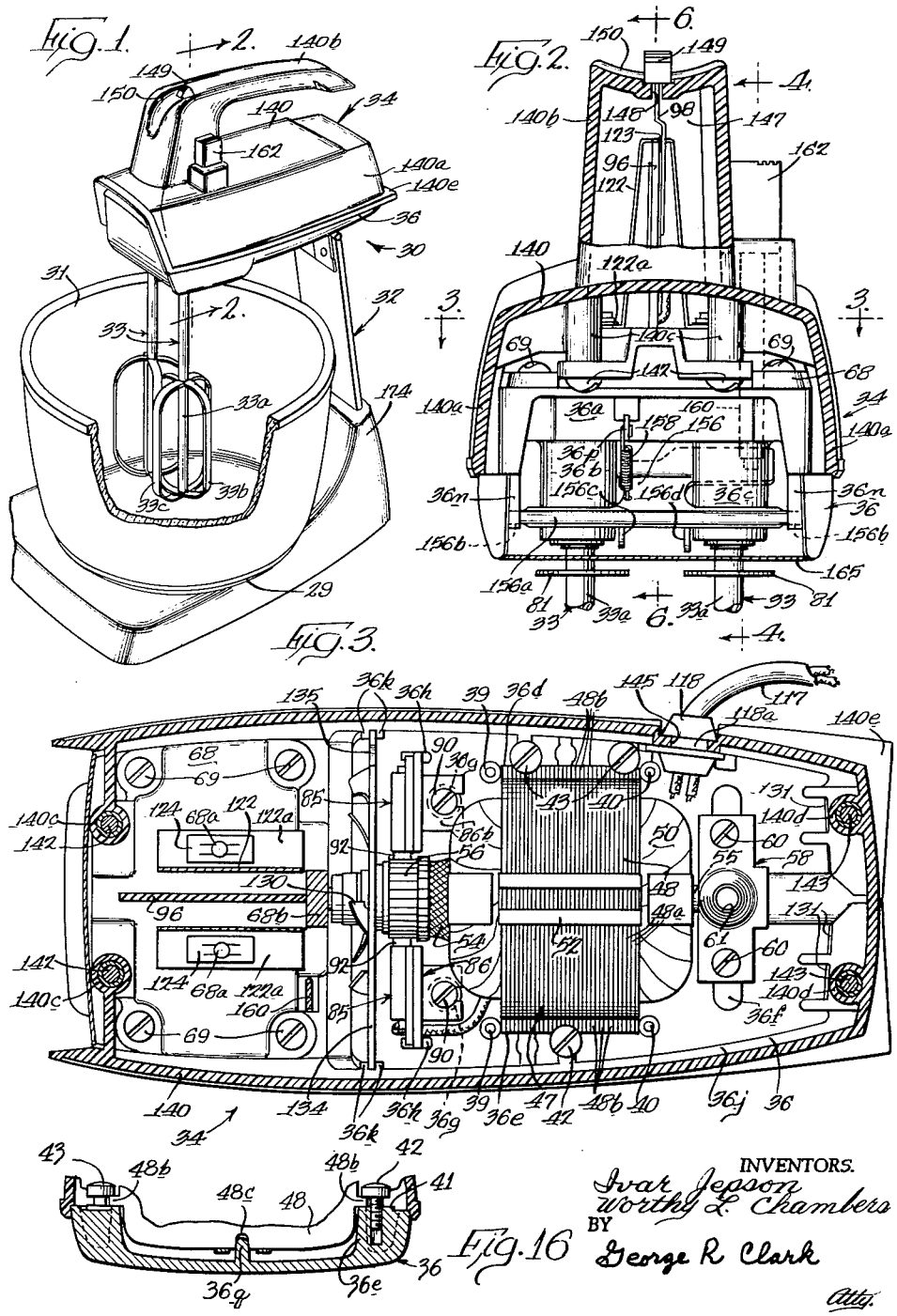

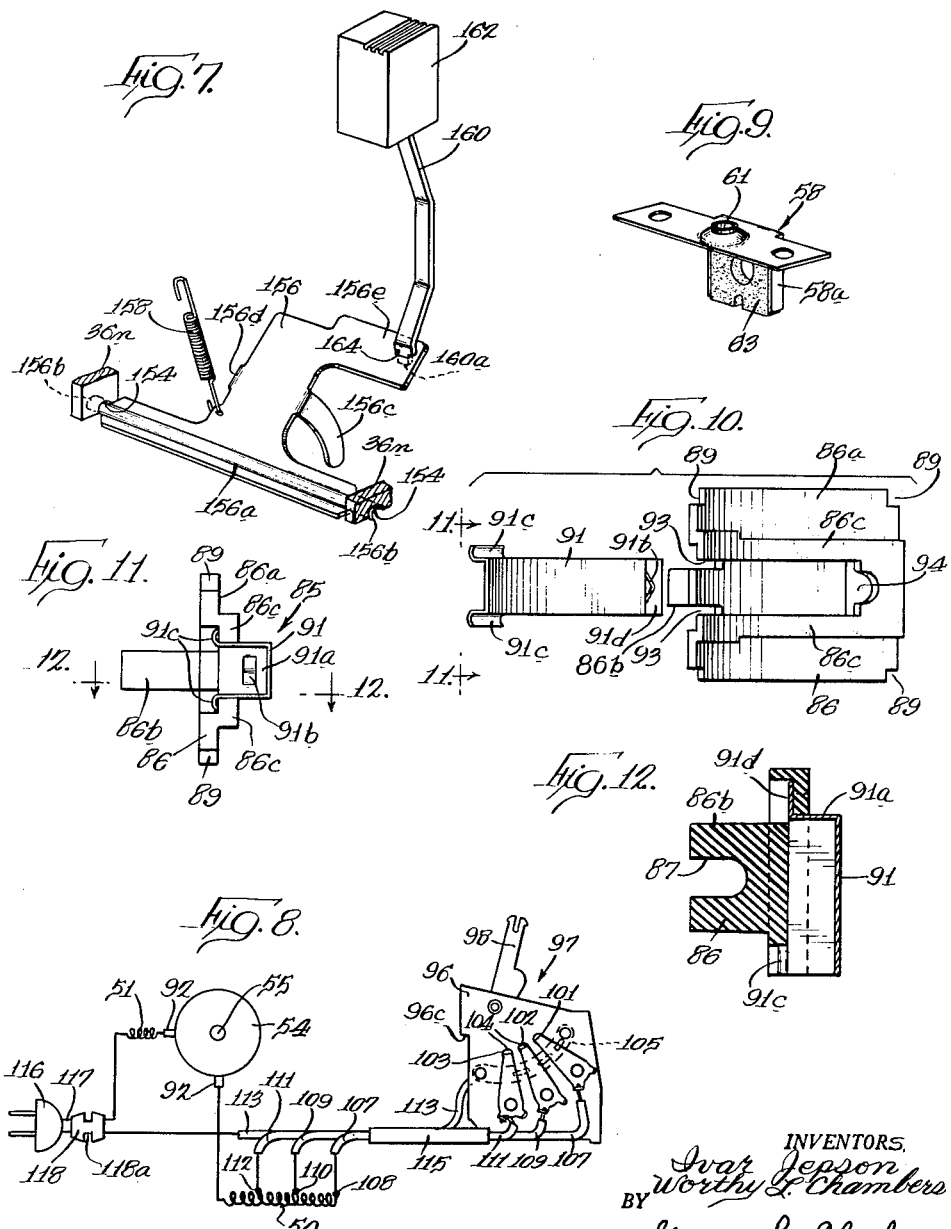

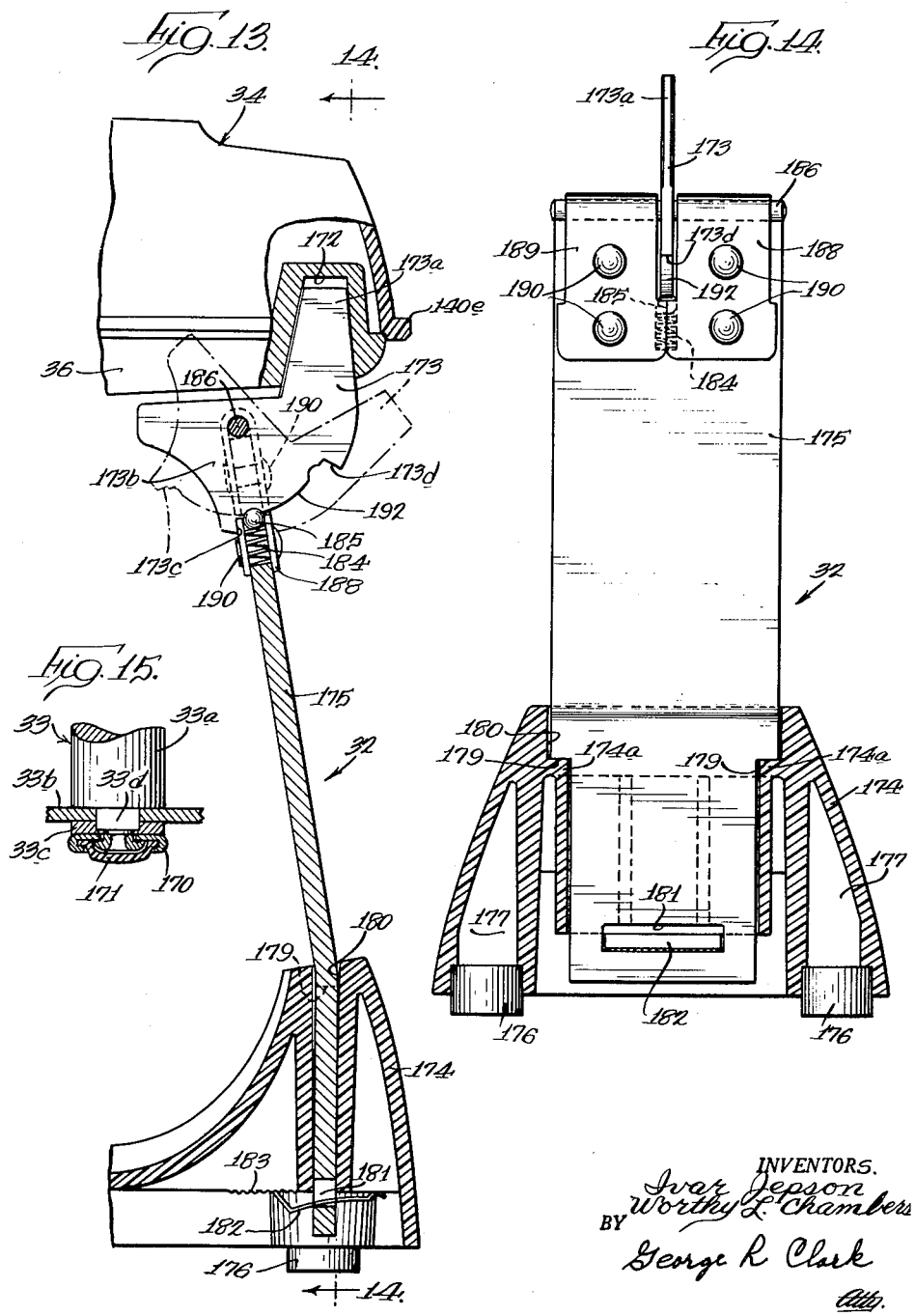

United States Patent Office 3,198,490
Patented Aug. 3, 1965

3,198,490
BEATER EJECTING MEANS FOR AN
ELECTRIC FOOD MIXER
Ivar Jepson, Oak Park, and Worthy L. Chambers, Wilmette, Ill., assignors to Sunbeam Corporation, Chicago, Ill., a corporation of Illinois
Original application Aug. 25, 1958, Ser. No. 756,853, now Patent No. 3,077,340, dated Feb. 12, 1963. Divided and this application Sept. 20, 1962, Ser. No. 224,947
5 Claims. (Cl. 259—1)

This application is a division of copending Jepson et al. application Serial No. 756,853, filed August 25, 1958, now Patent No. 3,077,340.

This invention relates to electric mixers, and more particularly to relatively small compact household mixers used in food preparation. The present invention is an improvement on Jepson Patent No. 2,987,636, assigned to the same assignee as the instant application.

The electric household mixing appliance or food mixer has become a standard and necessary tool of the housewife, and many millions of such mixers are in use today. Some of these household food mixers comprise a supporting stand with several mixing bowls, and a mixing unit associated with the stand to perform a mixing operation. More recently there has been a demand for a small mixer which would involve a minimum storage problem in small apartments and the like. The mixer of the above-mentioned patent is such a small mixer which has gone into extensive commercial use. Such small mixers were primarily intended to be held in the hand of the user during operation thereof. However, there has been a demand for such a small mixer which may also be supported on a stand for certain applications.

It would be desirable to provide a household food mixer which is very simple to build and assemble, and which may readily be disassembled for repair purposes of the occasion should arise. Heretofore such mixing appliances have been housed in a tubular casing of some sort, which necessitated the removal of the parts of such unit from the tubular casing to afford access thereto. It would be desirable to provide a household mixer in of the occasion should arise. Heretofore such mixing which the parts may be assembled on a base unit or the like while still being fully exposed for repair, and wherein the housing comprises such base unit and a suitable cover.

Many household food mixers have been provided with mechanisms for removing the beaters, commonly referred to as beater ejectors. Such devices permit the housewife or the user thereof to remove the beaters without physically grasping them and pulling them free from the mixing unit. This latter process is difficult when the beaters have been used if it is desired to avoid soiling the hands of the housewife. The beater ejectors which have heretofore been available have been rather complicated and expensive, and it would be desirable to provide a beater ejector mechanism which is simple and inexpensive to manufacture, and yet is foolproof in operation.

Accordingly, it is an object of the present invention to provide a new and improved electric household mixer.

It is another object of the present invention to provide improved beater ejector means in a household mixer.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

FIG. 1 is a perspective view of an electric mixer and supporting means thereof shown in a position for performing a mixing operation;

FIG. 2 is an enlarged sectional view of the mixer power unit taken substantially along line 2—2 of FIG. 1;

FIG. 3 is a sectional view taken on line 3—3 of FIG. 2, assuming that FIG. 2 shows the complete structure;

FIG. 4 is a view partly in section taken along line 4—4 of FIG. 2, again assuming that FIG. 2 shows the complete structure;

FIG. 5 is a sectional view taken on line 5—5 of FIG. 4, assuming that FIG. 4 shows the complete structure;

FIG. 6 is a fragmentary sectional view taken on line 6—6 of FIG. 2, again assuming that FIG. 2 shows the complete structure;

FIG. 7 is a perspective view of certain portions of the food mixer shown in the preceding figures showing the principal elements defining the so-called beater ejector according to the present invention;

FIG. 8 illustrates in diagrammatical form the electrical control circuit for the mixer motor;

FIG. 9 is a perspective view of a combined bearing retainer and thrust plate used in the mixer;

FIG. 10 is an enlarged exploded perspective view of one of the brush supports used in connection with the mixer motor;

FIG. 11 is an assembled view of the brush holder of FIG. 10 looking in the direction of the arrows 11—11 of FIG. 10;

FIG. 12 is a sectional view taken on line 12—12 of FIG. 11;

FIG. 13 is an elevational view partly in section illustrating details of the mixer stand or support means including its association with the mixer unit;

FIG. 14 is a view taken along line 14—14 of FIG. 13;

FIG. 15 is a greatly enlarged fragmentary sectional view of the lower end of one of the beater elements, and FIG. 16 is a fragmentary sectional view taken on line 16—16 of FIG. 4 assuming that FIG. 4 shows the complete structure.

The present invention accomplishes the objects set forth above in connection with a small hand operated mixer by providing a base member which defines at least one side of the mixer housing, upon which member is supported the motor field windings, the armature, fan, gearing, brushes, control switch and the like in a manner whereby all parts, when assembled with the base unit, are exposed to ready access. The housing is completed by applying a cover member which encloses the assembled mechanism. A very simple beater ejector is housed in a portion of the base and is operated in a foolproof manner. Although the mixer unit with the associated beaters may comprise the entire mixing device, which may be supported from a suitable hook or the like, if desired a suitable support may be provided for supporting the mixer and an associated mixing bowl. This support is designed to permit one-hand assembly of the mixer therewith, and which support is simple and compact and presents a minimum problem as far as storage is concerned.

Referring now to the drawings wherein like reference characters designate corresponding parts throughout the several views, there is shown a small household mixer, generally designated by the reference numeral 30, which may be held in the hand of the housewife or other person while being used for a mixing operation to be performed in a suitable mixing bowl 31, or, if desired, the mixer may be supported on a suitable stand generally designated at 32, having a turntable 29 for the bowl 31, which stand is described in more detail hereinafter. The mixer 30 includes the conventional beater elements 33 which are removable from an electrically motor driven unit contained in a suitable housing, which unit is generally designated by the reference numeral 34.

Considering first the power or motor driven unit 34 for driving the beaters 33, an important feature of the present invention comprises the provision of a motor base unit 36 which comprises a casting of aluminum or other suitable material from which all elements of the power unit are supported. This base unit 36 is essentially a platform from which various support members and the like integral with the platform project. The base unit 36 includes a portion 36a defining a shallow upwardly opening recess which cooperates with means described hereinafter to define a gear chamber 37 (FIG. 4). Integrally formed with the portion 36a are downwardly directed spaced sleeve portions 36b and 36c which house the driving spindle for the beaters 33 described in more detail hereinafter. As best shown in FIGS. 2, 4, 5 and 6 of the drawings, the motor unit base 36 is shaped to provide a recess 38 beneath the portion 36a defining the gear housing, into which recess the sleeves 36b and 36c depend. This recess 38 defines a beater ejector housing, as will be described in greater detail hereinafter.

For the purpose of supporting a suitable electric motor, the motor unit base 36 at the central portion thereof is provided on either side thereof with upwardly directed supports 36d and 36e. The supports 36d and 36e are very similar, one on either side of the base unit 36. Each comprises a pair of spaced upwardly directed pins 39 and 40 for positioning the motor therebetween as described hereinafter, and the unit 36e includes a single tapped projection 41 for receiving a clamping screw 42, while the unit 36d includes a pair of tapped projections similar to the projection 41 for receiving a pair of clamping screws 43.

In order to support the rear bearing of an electric motor, the base unit 36 is provided at the rear end thereof with a raised bearing support 36f (FIG. 4). Similarly, to support suitable brush retainers for a universal type electric motor, the base unit 36 is provided with brush holder supports on either side thereof, respectively brush holder supports 36g and 36h, the supports for only one side of the motor being visible (FIG. 4), but the supports for the other side being identical. It will be appreciated that the base unit 36 essentially defines the bottom of the housing of the power unit 34. To this end the base unit 36 is provided with an upwardly directed peripheral flange 36j which surrounds all but the front of the base unit, and hence provides a suitable shoulder 45, as best shown in FIG. 5 of the drawings, for cooperation with a suitable housing member described hereinafter.

It will be appreciated that a household mixer includes a prime mover, and to this end there is provided an electric motor, generally designated at 47, which comprises a stator 48 defined by a plurality of stator laminations 48a which are riveted together to form a stator assembly. Each of the stator laminations includes at either side thereof near the bottom lateral projections 48b so that the entire stator assembly is provided with a ledge for support on the projections 36d and 36e. The positioning projections 39 and 40, best shown for one side of the unit in FIG. 4 of the drawings, space the stator or field structure in the proper longitudinal position, and the stator may then be secured on the supports 36d and 36e by clamping screws 42 and 43 which engage the projections 48b of the laminations 48.

To secure accurate positioning of the motor stator assembly, the base member 36 is provided with an integral central rib or key 36q which is receivable in a cooperating recess or keyway 48c cut into the underside of the stator as clearly shown in FIGS. 4 and 16 of the drawings. Engagement of the key 36q in the keyway 48c insures accurate lateral positioning and proper angular orientation, thus eliminating any chance of misalignment of the motor parts. A single screw 42 on one side, and two screws 43 on the other side are sufficient properly to secure the stator to the base 36. It will be appreciated that the stator 48 will be clamped into the desired vertical and lateral position so as to be concentric with a suitable armature to be described hereinafter.

The field or stator windings designated at 50 and 51 may be identical with the windings disclosed in the above-mentioned Jepson patent, and preferably, as illustrated in FIG. 8 of the drawings, the field winding 50 is a tapped winding to provide the desired speed control. A suitable clip arrangement 52 preferably holds the stator windings assembled to the stator.

Rotatably mounted with respect to the field structure of the motor 47 is a suitable armature 54 (FIG. 4) mounted for rotation with a suitable armature shaft 55. The armature shaft 55 also supports a suitable commutator 56, since the motor 47 is preferably a so-called universal motor capable of operating from a source of either alternating or direct current.

For the purpose of supporting the armature 54 for rotation relative to the field structure in a manner well understood by those skilled in the art, there is provided, as best shown in FIG. 4, a rear bearing 57 which is suitably supported from the projection 36f of the motor unit base 36. This projection 36f is shaped with a semi-spherical upwardly directed recess to receive the bearing 57 therein, which bearing is held in position by a suitable combined bearing retainer and thrust bearing element 58, best shown in FIG. 9 of the drawings. A suitable thrust button 59, preferably formed of a sintered bronze impregnated with oil is pressed into the end of the armature shaft 55 so as to bear against the thrust bearing portion 58a of the combined bearing retainer and thrust bearing 58. A pair of screws 60 (FIG. 3) engaging tapped openings in the projection 36f hold the combined bearing retainer and thrust bearing 58 in position, and hence also hold the bearing 57 in position. In order to lubricate the bearing 57, the bearing retainer 58 is provided at the center thereof with a suitable opening 61 for receiving an upwardly directed wick 62 to supply oil in a manner which will readily be apparent to those skilled in the art. Preferably also the element 58 supports a felt or similar element 63 (FIG. 9) to insure the desired lubrication.

The forward end of the armature shaft 55 is suitably supported in a bearing 64, as best shown in FIGS. 5 and 6 of the drawings. The bearing 64 is disposed in a suitable depression 65 defined in the portion 36a of the motor unit base 36. In order to hold the forward bearing 64 in position, there is provided a bearing spring 66, best shown in FIG. 5 of the drawings, which is provided in a recess 67 of a gear box cover member 68, which, with the portion 36a, defines the gear chamber 37. As best shown in FIG. 3 of the drawings, the gear box cover 68 is suitably secured by a plurality of screws or fastening means 69 to the portion 36a, and the portion 36a and the cover 68 preferably include interlocking shoulder members designated at 70 (FIGS. 4 and 6 of the drawings). The spring 66 is designed so when pushed into the recess 67 the bowed ends thereof engage the recess walls to retain it in place prior to securing cover member 68 in place. Upon assembly of cover member 68 the spring 66 performs its bearing holding function and is deflected so the ends thereof move out of engagement with the recess walls as clearly shown in FIG. 5 of the drawings. A pair of front bearing seals 71 formed of felt or other suitable material (FIG. 6) prevent lubricating material such as grease contained within the gear chamber 37 from going outside the gear chamber.

In order to transmit the rotation of the armature shaft 55 to the beaters 33, there is provided on the end of the motor shaft 55 disposed within the gear chamber 37 a worm 73. This worm may be identical with that disclosed in the above-mentioned Jepson patent and, as in said patent, the worm 73 drives a pair of worm gears 74, only one of which is visible in FIG. 4 of the drawings. These gears 74 are each drivingly connected to a different one of a pair of hollow spindles 75, which hollow spindles are rotatably mounted within the sleeves 36b and 36c, respectively, of the base unit 36. In fact, the hollow spindles 75 are suitably journalled within the sleeves 36b and 36c. As best shown in FIG. 4 of the drawings, the gears 74 are secured to the respective one of the hollow spindles 75 as by set screws 76. It will be apparent that rotation of the armature shaft 55 and simultaneous rotation of the worm 73 will cause rotation in opposite directions of the two worm gears 74, and consequently of the hollow beater driving spindles 75.

As illustrated, a step drill is employed to provide the recess in the hollow spindles 75, and then a broaching tool is inserted to provide a pair of flutes or splines 78 so as to make driving connection with the beaters 33. As illustrated, each of the beaters 33 is provided with a shank 33a, the upper end of which is flattened as indicated at 33b drivingly to engage with the flutes or splines 78. The beater shanks are also provided with a recess for receiving spring retaining means 79 which engage suitable annular recesses 80 in the hollow driving spindles 75. As will be described in greater detail hereinafter, each of the beater shanks is provided with an enlarged shoulder portion 81 for cooperation with suitable beater ejecting means. It will be appreciated that the beater shank 33a of each of the beaters is inserted within one of the hollow spindles 75 so that the flattened portion 33b is in driving engagement with the flutes or splines 78, and the spring retainer 79 is in engagement with the associated recess 80 so that the beaters 33 are retained in driving engagement. The beaters may be removed by applying a force along the longitudinal axis of the beater shanks 33a in a direction away from the hollow spindles 75.

To complete the motor structure there are provided a pair of brush assemblies, generally designated at 85, best shown in FIGS. 3, 10, 11 and 12 of the drawings. As there illustrated, each brush assembly comprises a supporting member 86, preferably formed of molded insulating material. As illustrated, each insulating brush support 86 comprises a flat platelike portion 86a from which projects a lateral support section 86b, the latter portion being provided with a notch 87. The brush support member 86 is adapted to be supported on the support members 36h and 36g, integrally formed with the base 36. For each brush support 86 there are provided two projections 36h which are notched at the top as indicated at 88 (FIG. 4 of the drawings) so that the lower corners of the platelike portion 86a of the support 86 are received in these notches 88. Actually, the corners of the platelike portion 86a of the support 86 are cut away as indicated at 89 to be received within the notches 88. All four corners of the platelike member 86a are cut away to permit reversal of the support 86 for the opposite side of the motor 47. To further support the member 86, the projecting portion 86b engages the upper end of the support 36g and is suitably secured thereto by fastening means in the form of a screw 90 engageable with suitable tapped openings in the upper end of support member 36g.

For the purpose of suitably supporting in a readily removable member a suitable brush holder, the support 86 is provided on the side thereof opposite the projection 86b with integrally formed parallel disposed projections 86c which define a slide for receiving a movable brush holder 91 slidable therein. The brush holder 91 is preferably formed of brass or other good conducting material and provides a hollow chamber therein for receiving suitable brushes 92 (FIG. 3 of the drawings) as well as suitable compression springs, not shown, for biasing the brushes into engagement with the commutator 56 in a manner well understood by those skilled in the art. One end of the brush holder 91 is open to permit the associated brush 92 to extend out of the holder into engagement with the commutator 56. The other end of the holder 91 is closed, as indicated at 91a, so as to provide a support for the biasing spring biasing the brush into contacting engagement with the commutator. This closed end of the brush holder 91 is preferably provided with a projecting loop 91b whereby electrical connection with the brush holder and, consequently, the brush can readily be made.

As illustrated there is provided a simple arrangement for removably securing the brush holder 91 relative to the insulating support 86. As illustrated, the brush holder 91 is provided at its open end with a pair of lateral flanges 91c, and at its closed end with an end flange 91d. The support 86 is molded so as to provide cutaway portions 93 in the flat platelike portion 86a which extend partially beneath the parallel projections 86c. Similarly, the portion 86a is provided with an opening 94 which extends beneath an interconnecting projection interconnecting the projections 86c. When the brush holder is assembled in the manner of FIG. 12 of the drawings, the flange 91d is locked beneath interconnecting portions of the projections 86c and, similarly, the flanges 91c move frictionally against the underside of the projections 86c into the openings 93 beneath the projections 86c securing the brush holder 91 snugly in assembly with support 86. This arrangement is obtained by a simple molding operation without any subsequent machining or the like.

In the above-mentioned patent there is disclosed and claimed an electric switch for controlling the beater motor and providing a plurality of selective speeds, which switch is positioned so that it is disposed in a handle portion and may be readily manipulated by the operator. Substantially the identical switch is employed in the instant application and, as best shown in FIGS. 6 and 8 of the drawings, comprises a flat insulating plate 96 upon which all the elements of the switch are mounted. Except for the particular shape of the plate 96, the switch generally designated at 97 is identical with the switch disclosed and claimed in the above-mentioned patent. It comprises a switch control arm 98 pivotally mounted about a pivot 99 mounted in the support 96. Secured to the control arm 98 and pivotally movable therewith is a switch arm 100 which is adapted selectively to engage one of a plurality of switch contacts 101, 102 and 103 which have the ends thereof extending through a series of spaced openings 104 in the insulating plate 96. For the purpose of controlling the effectiveness or ineffectiveness of the wiper arm 100, and to provide an electrical circuit for part of the switch, there is mounted on the insulating plate 96 a curved contact control strip 105 upon which the wiper arm 100 rides as it is pivoted about pivot pin 99. The wiper arm 100 is formed of a spring material and is biased toward the insulating plate 96 to insure continuous electrical contact between the wiper arm and the bus bar or strip 105. As best shown in FIG. 8 of the drawings, each of the contacts 101, 102 and 103 is electrically connected to a different tap on the field winding 50 of electric motor 47, the contact 101 being connected through a conductor 107 to a tap 108, the contact 102 being connected through a conductor 109 to the tap 110, and the contact 103 being connected through a conductor 111 to the tap 112. A fourth conductor 113 is connected to the bus bar 105. Preferably these four conductors are included in a suitable insulating sheath 115 to facilitate electrical interconnection of the switch contacts and the remainder of the motor circuit including the tapped field winding 50.

Electrical power for the motor 47 is supplied though a conventional power plug 116 and a twin conductor 117 which enters the motor housing through a suitable grommetlike strain relief member 118, best shown in FIGS. 3 and 8 of the drawings. One lead of the twin conductor 117 is connected to the conductor 113 heretofore described, while the other lead is connected to the field winding 51. These field windings 50 and 51 are connected each to a different one of the brushes 92 associated with the commutator 56.

The off position of the switch 97 comprises the extreme left-hand position of the wiper arm 100, as viewed in FIG. 6 of the drawings, and in this position the wiper arm rests upon one end of a raised portion 105a of the bus bar 105. As the wiper arm rotates in a counterclockwise direction as viewed in FIG. 6 of the drawings, it moves successive raised portions 105b and 105c and also drops into a space between the raised portions. It is in these spaces between the raised portions that contact between the arm 100 and the contacts 101, 102 and 103 is permitted. The raised portions then provide a sort of detent arrangement for positioning the switch in a series of different positions and further provide a relatively fast make and break of the contacts. As was pointed out above, the details of the switch 97 form no part of the present invention but are fully disclosed and claimed in the above-mentioned patent.

For the purpose of supporting the switch 97 in the top forward portion of the unit 34, the bottom edge of the insulating plate 96 is provided with a pair of integral downwardly directly tabs 96a and 96b which are adapted to be received in corresponding recesses 120 and 121 defined in the top of the gear box cover 68. In order to hold the switch 97 with the tabs 96a and 96b engaging the recesses 120 and 121, there is provided a switch housing 122, preferably formed of an insulating material such as cardboard or paper material, which houses the switch as best shown in FIG. 2 of the drawings. This paper housing 122 essentially comprises a member folded into a U-shape with an opening 123 at the top to permit the control arm or manipulating lever 98 to extend therethrough. Essentially, the opening 123 is in the bight of the U-shaped housing 122. The ends of the leg portions of the U-shaped housing 122 are bent at an angle to provide lateral flanges 122a which overlie the gear housing cover 68. Preferably, these flanges are secured to the gear housing in any suitable manner. As illustrated, the gear housing cover 68 is provided with integral projections 68a on either side of the recesses 120 and 121 which extend through suitable openings in the flanges 122a. Suitable speed fastening means 124 may be secured to the projections 68a to hold the housing 122 in position. This arrangement will not only hold the housing in position but will hold the switch in assembled relationship with the gear box cover 68. To further secure and support the switch supporting plate 96, the gear box cover 68 is preferably provided with an integral upwardly directed projection 68b having a notched recess 126 in the upper end thereof to receive a shoulder portion 96c defined on one edge of switch plate 96, as best shown in FIGS. 6 and 8 of the drawings. With this arrangement the switch mechanism 97 is joined and relatively firmly supported on the gear box cover 68 with all portions thereof except the top and the front edge of the plate 96 being firmly supported.

It will be appreciated that the motor unit 47 should preferably be provided with air cooling means to cool the same, and to this end there is mounted on the shaft 55, immediately adjacent the commutator 56, a suitable fan 130 which may be secured to the shaft 55 in any suitable manner. This fan is arranged to cause air to enter through suitable openings 131 at the rear of the base unit 36 and pass over the windings of the motor 47 and out of the motor chamber through openings 132 and 133, and over the gear box cover 68, best shown in FIGS. 4 and 5 of the drawings, in a manner which will readily be understood by those skilled in the art. This direction of air flow is desired because there is less likelihood of drawing food material such as flour or the like into the motor housing.

To provide a shroud for the fan 130 and to support the electrical conductors, there is preferably provided a shroud member 134 which has a notch 135 in one upper corner for receiving therein the insulating sleeve 115 containing the respective electrical conductors. Thus, the shroud also serves to properly position the conductors so they cannot get into the moving parts of the apparatus, particularly the fan. Preferably, the shroud is supported in grooves defined between projections 36k (FIG. 3) integrally formed with the flange 36j of the base 36. The flange 36j is provided with a suitable notch, not shown, for receiving the strain relief member 118 which preferably includes a central annular recess 118a to secure the same in such notch. The member 118 is suitably molded or otherwise secured to the twin lead conductor 117 so that when the recess 118a thereof in the member 118 is engaged with the walls defining such notch in the flange 36j a suitable strain relief is provided.

In order to complete the housing for the power unit 34, there preferably is provided a cover member 140 formed of molded plastic material which is provided with a depending flange 140a on the two sides and rear (FIG. 3) to engage the peripheral flange 36j. The cover member 140 is preferably provided with an integral handle portion 140b to permit the user to grasp the same during a mixing operation. Preferably, the housing is secured to the base unit by suitable fastening means 142 at the forward end thereof and suitable fastening means 143 at the rear end thereof. Specifically, the cover member 140 is provided with integrally molded downwardly directed projections 140c at the forward end thereof (FIGS. 2, 3 and 4), and similar projections 140d at the rear thereof (FIG. 3), which projections are provided with tapped inserts to receive the fastening means 142 and 143, respectively.

To cooperate with the notch defined in the flange 36j of the base 36 for the strain relief member 118, the depending flange of the cover member 140 is provided with a similar cooperating notch 145 to accommodate the portion of the strain relief member 118 extending above the bottom of the cover member. It will be understood that when the cover member 140 is secured to the base 36 the strain relief member 118 will effectively close the opening defined by the notches 145 and the cooperating one in flange 36j.

The rear end of the cover member 140 is provided with a narrow rearwardly extending flange or ledge 140e (FIG. 4) which, with the end of the handle member 140b, provides a firm support to permit the mixer to effectively stand on its rear end when not used during a mixing operation, particularly if the power unit 34 is used without the stand 32, which is commonly the case.

In order to accommodate the switch 97 previously described, a portion of the handle 140b integrally formed with the cover member is hollow to define the switch chamber 147, best shown in FIGS. 2, 5 and 6. A suitable slot 148 is provided at the upper end of the handle chamber 147 to permit the control arm 98 for the switch 97 to extend therethrough. A suitable manipulating knob 149 is secured to the end of the control arm 98 extending through the slot 148 and above the handle 140b. Preferably, the upper surface of the handle is of concave construction as indicated at 150 (FIGS. 2 and 6) to permit the thumb of the housewife to be disposed therein immediately adjacent the switch control knob 149, and by merely moving her thumb along the concavity 150 defined in the handle the switch 97 may readily be manipulated to four different positions. Preferably, suitable indicia are provided in the concavity 150 defined in the upper handle surface adjacent the slot 148 readily to indicate the desired position of the knob 149 and, consequently, the desired switch position for certain mixing operations, such, for example, as whip, blend, fold, beat, stir and so forth.

For the purpose of supporting the fan shroud 134 at its upper end, the cover member 140 is preferably provided with depending projections such as 140f for holding the upper end of the shroud in position. Also, the cover member 140 is provided with a depending tubular member 140g (FIG. 4) which is connected with an opening 151 (FIG. 4) whereby a suitable lubricant may be supplied to the wick 62 previously described. Also, to support the top and the front edge of the switch plate 97, the top of the switch chamber 147 is provided with means defining shoulders 140h and 140j (FIG. 6) which engage the top of the plate 97 and additionally a groove is defined between spaced parallel projections at the front of the switch chamber 147 for receiving therein the front edge of the plate 97.

Many times a housewife desires to store the mixer without using up shelf or drawer space in the kitchen. To this end the power unit 34 is provided with means permitting it to be hung from a suitable support. Accordingly, there is provided at the forward end thereof and extending into the beater ejector chamber 38 a supporting plate 152 (FIGS. 5 and 6) having a suitable keyhole slot therein, not shown in the drawings. This supporting plate 152 is preferably secured to a boss 36m integrally formed with the base unit, which boss is provided with a tapped opening to accommodate fastening means 153.

In accordance with the present invention there is provided an improved beater ejector means which is very simple in construction and easy to assemble. To this end there are integrally formed with the base 36 within the chamber 38 a pair of trunnion supports 36n, which are essentially projections into the beater ejector chamber 38 with downwardly directed trunnion receiving recesses 154. Mounted for pivotal movement with respect to the trunnion receiving recesses 154 is an ejector 156. This ejector includes an elongated portion 156a having at either end thereof coaxially arranged trunnions 156b. Preferably, the ejector 156 is a stamping, and the trunnions are defined by a longitudinal groove along the length of the portion 156a so as to provide an upper convex surface for engagement with the trunnion receiving recesses 154. The ejector 156 includes a pair of integral downwardly directed ejector arms 156c and 156d which are disposed in such position as to engage the enlarged shoulder portions 81 secured to the shanks 33a of the beaters 33. In accordance with the present invention the ejector arm 156d is slightly longer than the ejector arm 156c, as clearly shown in FIG. 2 of the drawings, so that it engages and releases its beater element 33 before arm 156c becomes effective. Thus the force for operating the ejector 156 need never be greater than that required to eject one beater element. In order to hold the ejector 156 with its trunnions 156b in engagement with the trunnion receiving recesses 154, and simultaneously to bias the ejector 156 into nonejecting position, there is provided a tension spring 158 which has one end thereof secured to a suitable opening defined in the ejector 156 between the common axis of the trunnions 156b and the ejector arms 156c and 156d. The other end of the spring 158 is suitably secured to a projection 36p integrally formed with the base 36 and disposed at the upper forward portion of the beater ejector chamber 38.

For the purpose of manually actuating the ejector 156 when desired, the ejector 156 is provided with a lateral integral extension 156e which is connected to a suitable ejector link 160. This ejector link extends outside the cover member 140 through a suitable opening 161 defined therein. The upper end of the link is connected to a relatively large rectangular control knob 162 which is receivable in the opening 161 which is correspondingly rectangular. Preferably also the handle portion 140b of the cover member 140 has a recess 163 or undercut portion defined therein to accommodate the knob 162. The upper shoulder of this recess 163 then defines a stop for the knob 162 thus defining the upper limit of the pivotal movement of the spring biased ejector 156. The link 160 is bent slightly so that it does not interfere with the gear housing defining the gear chamber 37, as is best shown in FIG. 4 of the drawings. It will be appreciated that when the housewife desires to eject the beaters 33, all she need do is to press downwardly on the knob 162, thus causing the ejector plate 56 to pivot about the trunnions 156b in a clockwise direction as viewed in FIG. 6 of the drawings against the force of tension spring 158. Under these conditions the ejector arms 156c and 156d move from the solid line positions of FIG. 6 to the dashed line positions with the resultant ejection first of one beater by the arm 156d and then of the other beater by the arm 156c by engagement with the associated shoulders 81. The spring 158 not only holds the ejector 156 in position, but constantly biases it to the nonejecting position shown in FIG. 4 of the drawings. In view of the detailed description included above, the simplicity of manufacture and assembly will readily be appreciated. The ejector 156 need merely be positioned with its trunnions 156b in the recesses 154, whereupon the spring 158, when secured to the hook 36p, causes the ejector 156 to be in operative condition. Preferably, the link 160 is merely provided with a tab 160a at the lower end thereof receivable in a suitable opening 164 defined in the extension 156e of the ejector 156.

For the purpose of enclosing the beater ejector chamber 38, there is provided a closure or escutcheon plate 165, which preferably is merely snapped into place. As illustrated, the plate 165 preferably includes a pair of integral tabs 164a (FIGS. 4 and 5) which extend into the air openings 132 and 133, respectively, thus securing the rear end of the escutcheon plate 165 in position. The forward and upper end of the escutcheon plate preferably snaps behind a suitable shoulder defined by a projection 140k of the cover member 140 (FIG. 4). To permit the cooling air drawn through the motor housing to pass out of the beater ejector chamber 38, the escutcheon plate 165 is provided with a deformation defining an air outlet opening 166. Likewise, the escutcheon plate is provided with suitable openings 167 (FIG. 4) at the bottom thereof to accommodate the shanks 33a of the beaters and narrow slits 168 (FIG. 6) to accommodate the ejector arms 156c and 156d. Similarly, a keyhole-shaped opening, not shown, aligned with an identical opening in support plate 152 is provided.

As illustrated the lower ends of each of the beaters 33 is provided with suitable means to prevent damage or discoloration of the bowls 31. In this connection reference may be had to FIG. 15, which is a greatly enlarged view of the bottom end of one of the beaters 33. The radially disposed beater bands 33b and 33c are shown in section at the point of crossing thereof, where an extension of reduced cross section 33d of the shank 33a extends through aligned openings in these bands. As is clearly evident from FIG. 1 of the drawings, the radially disposed beater bands 33b and 33c are arranged at right angles relative to each other. As illustrated in FIG. 15 of the drawings, the end of this extension 33d is peened over to secure thereto a suitable annular clip 170. The annular clip 170 holds a nylon disk or button 171 securely to the lower end of the beater shank 33a. Instead of the clip 170, fastening means such as disclosed in Jepson Patent No. 2,552,972 may be employed.

In order that the motor unit 140 may be supported from the stand in a manner so that the operator may support the unit from the stand or remove it therefrom with one hand, the base 36 of the power unit 34 is provided at the rear thereof with a narrow recess 172, best shown in FIGS. 4 and 13 of the drawings. This recess is effectively a narrow slot having a uniform width in one dimension and a diverging cross section in the other dimension, as clearly shown in FIG. 13 of the drawings. The edges along the diverging dimension are V-shaped to provide a centering and stabilizing effect on cooperating means described hereinafter. This recess accommodates a correspondingly shaped portion 173a of a pivotal member 173, best shown in FIGS. 13 and 14 of the drawings which has beveled edges cooperating with the V-shaped edges of the recess 172. The beveled edges and diverging configuration insures a readily separable but stable support. The pivotal member 173 is pivotally mounted at the upper end of the stand 32, which stand includes a platform 174 supporting an upright member 175 suitably secured thereto. The platform 174 of the stand 32 is preferably a molded plastic member supported on a plurality of feet 176 which may comprise cylindrical rubber or resilient members inserted in suitable recesses such as 177 defined in the platform 174. The platform 174 supports the turntable 29 in the conventional manner so that the bowl 31 may be rotated with the turntable 29 relative to the platform 174.

The upright 175 preferably comprises a metal strip having defined near the lower end a pair of shoulders 179. The upright 175 is inserted into a slot 180 molded in the platform 174 until the shoulders 179 thereof engage cooperating ledges 174a defined within the slot or recess 180.

The lower end of the upright 175 is provided with an elongated opening 181 therethrough for receiving a suitable resilient clamping means 182 which engages against the underside of the platform 174. As illustrated in FIG. 13, the underside of the platform is provided with sort of ratchet teeth 183, and the resilient member 182 is pushed through the opening 181 and prevented from coming out by the ratchet teeth 183. This arrangement forces the shoulders 179 into engagement with the ledges 174a and secures the upright 175 to the platform 174 in a very simple but effective manner.

For the purpose of pivotally supporting the member 173 from the upper end of the upright 175, the upright is effectively bifurcated at the upper end by a suitable slot within which is received a compression spring 184 and a spherical member 185. A suitable shaft 186 extending through an opening defined in the pivotal support 173 is disposed along the upper end of the upright 175, as clearly shown in FIG. 14 of the drawings, with a portion 173b of the pivotal support 173 disposed in the slot and having an edge thereof engaged by the spherical member 185 which is biased toward the pivotal member 173 by the spring 184. For the purpose of holding the shaft 186, the pivotal member 173, the spherical member and the spring 184 assembled to the upright 175, there are provided a pair of U-shaped plate members 188 and 189 which are secured by suitable rivets 190 in the manner clearly indicated in FIGS. 13 and 14 to the upper end of the upright 175. The pivotal member 173 is provided with a pair of spaced shoulders 173c and 173d at the lower edge defining a notch 192 therebetween. The notch 192 has a curvilinear configuration and is provided with slight indentations at either end to form detents for the reception of the spherical member 185, thus selectively locking the pivotal member 173 in either the solid line position of FIG. 13 or the dashed line position there shown. In the solid line position the power unit 34 is supported for the well-known mixing operation shown in FIG. 1 of the drawings. The dashed line position will cause the mixer to be supported in a nonmixing position to afford the housewife access to the bowl 31, which may then readily be removed. It will be understood that the shoulders 173c and 173d limit the extremes of pivotal movement of the member 173.

In view of the detailed description included above, the operation of the present invention will readily be understood by those skilled in the art and no further discussion thereof is included herewith.

It will be appreciated that there has been disclosed a very simple construction which can be assembled with ease. Moreover, ready access to all the parts of the power unit can be had by mere removal of the cover member.

While there has been illustrated and described a single embodiment of the mixer unit of the present invention, it will be understood that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. A beater ejecting mechanism for a food mixer of the type having a casing with means defining a gear chamber within said casing, a rotatable drive spindle mounted in said casing and extending into said gear chamber, one end of said spindle being exposed through a wall of said casing, a beater for removable driving engagement with the exposed end of said spindle, means for removably holding said beater and spindle in driving engagement and constructed for disengagement by forced axial movement of said beater relative to said spindle, means defining a shoulder on said beater immediately adjacent said spindle, a beater ejector comprising a plate, means for pivotally mounting said plate to said casing beneath said gear chamber, an ejector arm secured to said plate and extending toward said shoulder, said arm and plate occupying respective planes generally perpendicular to each other, means for biasing said plate and ejector arm away from said shoulder and for simultaneously rendering effective said means for pivotally mounting said plate, and means extending outside said casing for pivotally moving said plate and ejector arm to engage said shoulder and forcibly disengage said beater from said spindle.

2. Beater ejecting means for a food mixer having a casing with means defining a gear chamber within said casing, a rotatable drive spindle mounted in said casing and extending into said gear chamber, one end of said spindle being exposed through a wall of said casing, a beater for removable driving engagement with the exposed end of said spindle, means for holding said beater and spindle in driving engagement and constructed for disengagement by forced axial movement of said beater relative to said spindle, means defining a shoulder on said beater immediately adjacent said spindle, a beater ejector comprising a plate pivotally mounted to said casing beneath said gear chamber, an ejector arm secured to said plate and extending toward said shoulder, means for simultaneously biasing said plate and ejector arm away from said shoulder and for holding said plate in position for pivotal movement beneath said gear chamber, and reciprocating means extending outside said casing for actuating said plate and ejector arm to move said beater from said spindle.

3. For use with a food mixer having a casing and a rotatable drive spindle with one end of said spindle being exposed through a wall of said casing and a beater for removable driving engagement with the exposed end of said spindle wherein means are provided for holding said beater and spindle in driving engagement and constructed for disengagement by forced axial movement of said beater relative to said spindle, the combination of means defining a shoulder on said beater immediately adjacent said spindle, a beater ejector comprising a unitary stamping having an elongated portion at one end with pivot means at each end of said elongated portion, means for pivotally mounting said stamping about said first means in a recess beneath said casing, an arm comprising a part of said stamping extending toward said shoulder, means for biasing said stamping including said arm away from said shoulder, and means extending above and through said casing for pivotally moving said stamping and associated arm to move said beater from said spindle.

4. The combination of claim 3 wherein said food mixer has a handle at the top of said casing and said last mentioned means includes a reciprocally movable knob movable in a recess in said handle.

5. An ejector mechanism for ejecting a pair of beater elements from a food mixer comprising a substantially flat plate with means at one end thereof for pivotally mounting said plate, said plate including a pair of elongated spaced parallel arms depending downwardly from said plate toward shoulder means on said beater elements, the planes of said arms being generally perpendicular to the plane of said plate, one of said arms being longer than the other so that downward pivotal movement of said plate will cause one arm to engage its associated shoulder and release one of said beater elements prior to the release of said other element in response to continuous pivotal movement of said plate.

References Cited by the Examiner
UNITED STATES PATENTS

| | | | |
|---|---|---|---|
| 2,326,996 | 8/43 | Fuge | 248—13 |
| 2,584,214 | 2/52 | Luther et al. | 310—247 |
| 2,615,939 | 10/52 | Mitchell | 310—247 |
| 2,701,698 | 2/55 | Holstein | 248—13 |
| 2,737,371 | 3/56 | Gerry | 259—1 |
| 2,744,734 | 5/56 | Schoen | 259—1 |
| 2,773,679 | 12/56 | Miller | 259—1 |
| 2,797,901 | 7/57 | Seyfried | 259—1 |
| 2,798,696 | 7/57 | Kuhagen et al. | 259—1 |
| 2,815,939 | 12/57 | Kibbe | 259—1 |
| 2,842,346 | 7/58 | Koch | 259—1 |

CHARLES A. WILLMUTH, *Primary Examiner.*